Patented Nov. 13, 1934

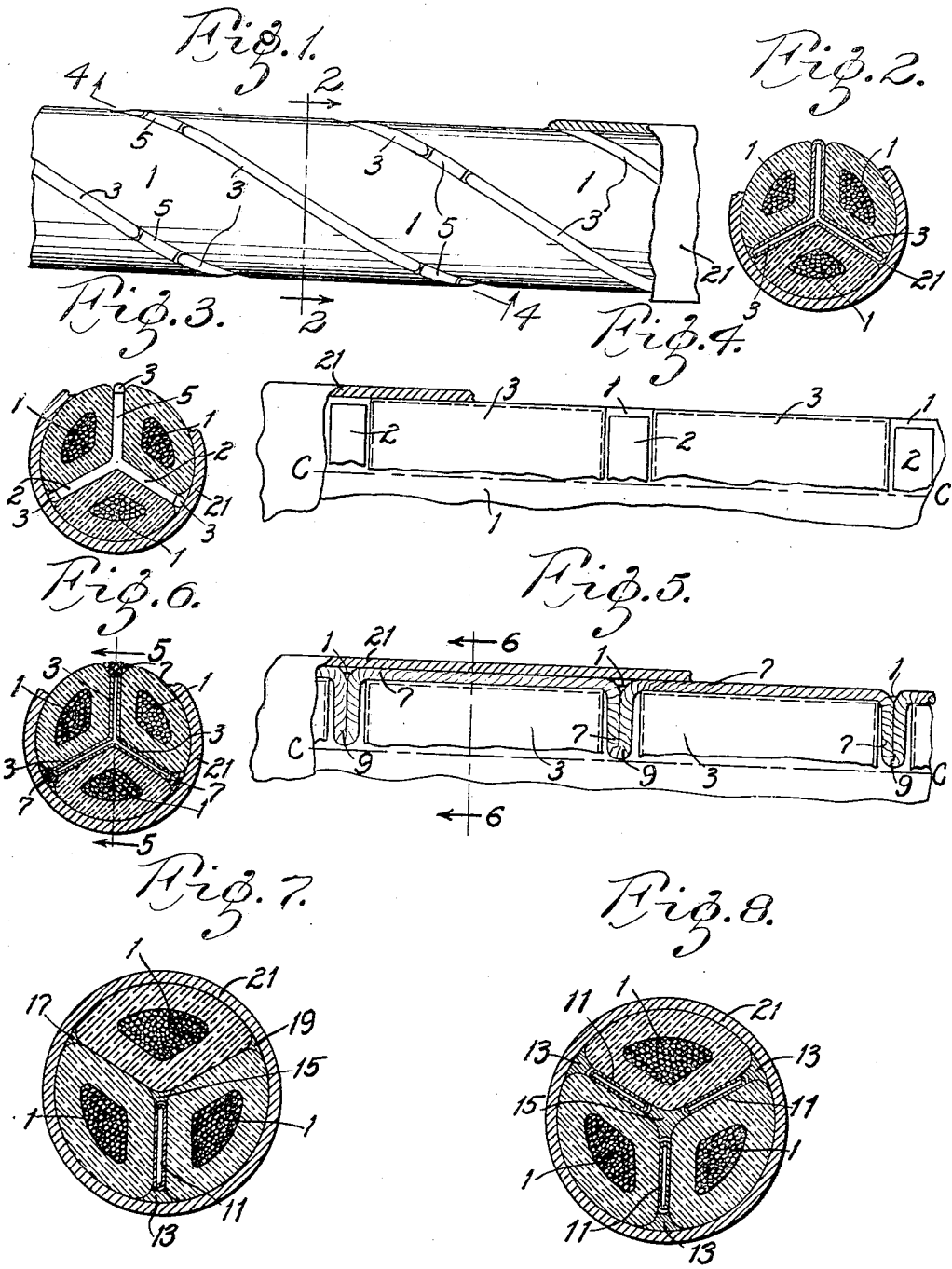

1,980,320

UNITED STATES PATENT OFFICE 1,980,320

CABLE

Philip H. Chase, Bala-Cynwyd, Pa.

Application October 17, 1929, Serial No. 400,283

19 Claims. (Cl. 173—266)

This invention relates to cable, and with regard to certain more specific features, to cable having improved spacing and expansion means therein.

Among the several objects of the invention may be noted the provision of a cable having expansion tubes therein with spacing means for the purpose of relieving said tubes against mechanical pressure during manufacture, installation and use; the provision of a device of the class described in which both lateral and longitudinal pressure shall be relieved and the provision of a device of the class described which shall permit greater freedom of movement of said expansion tubes. Other objects will be in part obvious and in part pointed out hereinafter.

The invention accordingly comprises the elements and combination of elements, features of construction, and arrangements of parts, which will be exemplified in the structure hereinafter described, and the scope of the application of which will be indicated in the following claims.

In the accompanying drawing in which are illustrated several of various possible embodiments of the invention.

Fig. 1 is a side elevation of a section of three-conductor cable core with the lead sheath thereof removed;

Fig. 2 is a cross section taken substantially on line 2—2 of Fig. 1, illustrating in cross section a certain trifurcated expansion member;

Fig. 3 is a sectional view of a cable of Fig. 1, so taken that it illustrates the appearance at the end of the tubing shown in Figs. 1 and 2, the view also showing a spacer;

Fig. 4 is an elevation of the developed side surface of an insulated conductor of Fig. 1, the view being taken substantially along line 4—4 of Fig. 1;

Fig. 5 is an elevation similar to that of Fig. 4, but showing a modification in which spacer means function both longitudinally and radially of the cable, the view being taken substantially along line 5—5 of Fig. 6;

Fig. 6 is a cross section taken on line 6—6 of Fig. 5;

Fig. 7 illustrates an end section of a three-conductor cable with one expansion tube or one series of expansion tubes between conductors; and, Fig. 8 illustrates an end section of a three-conductor cable having three expansion tubes or three series of expansion tubes between conductors.

Similar reference characters indicate corresponding parts throughout the several views of the drawing.

Referring now more particularly to Fig. 1, there are illustrated at numerals 1, a plurality of insulated conductors laid up helically (see also Figs. 2 and 3), with relatively light expansible tubes of trifurcated shape laid between said conductors 1. The tubes or expansion members 3 are composed of a light, strong, flexible metal so that they may change in shape with changing external and/or internal pressure. These tubes are filled with a fluid, preferably a gas. However, the filler may comprise a liquid where arrangements are made for interconnection with one or more expansion chambers. The walls of the tubes or expansion members may be pervious, such as by means of perforations, for example, to the cable impregnative compound or oil in case it is desired as the filler medium in the tubes. It is to be understood that the tubes herein shown are closed at their ends as illustrated in Figs. 4 and 5.

One of the features of this invention comprises the application of spacing blocks 5 located longitudinally between juxtaposed pairs of said tubes 3. These blocks 5 are for the purpose of relieving the tubes 3 of excessive mechanical pressure during manufacture, installation and use.

The blocks 5 may comprise material such as jute, paper, fibre, pressboard, or metal.

It is clear that the spacers 5 not only relieve the tubes of mechanical pressure but they also prevent the more or less tapered ends of the tubes from slipping past one another and becoming wedged.

It will be understood that the shapes of the blocks 5 may be varied to conform to the number of conductors used. In the embodiment shown in Figs. 1 to 3 a three-conductor cable has been illustrated and therefore a trifurcated spacer 5 has been shown. The number of legs on the spacer clearly can be changed or modified to suit the number of conductors used. It is also evident that even under the conditions at Figs. 1 to 3 the spacers may be flat, and in such case one spacer would be placed between each pair of insulated conductors and between successive tubes. In other words, the same effect would result, except that the legs 2 (see Fig. 3) of the trifurcated spacer would be separated one from the other.

In Fig. 4, which shows the developed side surface of one of the insulated conductors of Fig. 1 with one leg of each spacer illustrated fragmentarily with one leg of each tube, the axis of the cable is indicated at line C—C. This figure 4 further illustrates what is also shown at Fig. 3, namely that the radial reach of the spacer may be less than that of the tubing.

In Fig. 5 is shown a construction similar to that of Fig. 4 except that it has been modified to the extent that the spacer function is both longitudinal and radial of the cable. Substantially all spaces are filled. In this case the spacer 7 comprises a continuous, looped length of rope, jute or other suitable material, which occupies longitudinally a part or all of the filler space outside of the tube 3, the same also being doubled into bights 9 to serve as spacers lying between successive hollow tubes 3. As illustrated in Fig. 6 a plurality of parallel stranded spacer members 7 may be used. This construction also has the advantage of further relieving the tubes 3 of much mechanical pressure from the insulated conductors themselves by serving continuously in a longitudinal direction to space apart the outer edges or corners of the insulated conductors and also at intervals also serving as radial spacing means.

In Fig. 7 is illustrated a three-conductor cable in which is used a single continuous tube or a single series of tubes 11 having a flat shape. In this case there is used a longitudinal spacer 13 outside of the tube and another central longitudinal spacer 15, for relieving the tube of mechanical pressure from the adjacent insulated conductor. The lateral longitudinal spaces 17 and 19 which lie between the conductors and the sheath, are provided with the usual filler material, or they may be left open for the passage and/or storage of oil or compound.

In Fig. 8 is illustrated the use of a three-conductor cable with three continuous tubes or three series of tubes 11; also spacer material 15 centrally of the conductor and spacer material 13 in the lateral spaces.

In Figs. 7 and 8 the spacer material is shown positioned slightly away from the edge of the tube in order to permit greater freedom of movement of the tube. This construction is useful with some cable constructions; in others it may be unnecessary. Figs. 7 and 8 illustrate that the expansion tubing 3 need not be composed of a single element for each longitudinal unit. That is to say, like the spacers themselves, the legs of the tubing may be separated as illustrated in Figs. 7 and 8. It is also to be understood that the spacer means of Figs. 1 to 6 may be used in connection with the Figs. 7 and 8 construction in case a series of tubes is used, and the spacer means of Figs. 7 and 8 may be used in connection with the Figs. 1 to 6 construction.

In each of the figures, for the purpose of clarity, the cable sheath has been shown at least fragmentarily by the numeral 21.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A cable comprising a sheath, a plurality of conductors therein, a series of expansible tubes between said conductors, said tubes being spaced from one another and spacing means located between the tubes adapted to space the tubes and the conductors.

2. A cable comprising a sheath, a plurality of helically laid conductors therein, expansion members having legs spacing said conductors, said legs being equal in number to the number of said conductors and spacers between each two adjacent members of said expansion means of the series.

3. A cable comprising a sheath, a plurality of conductors therein, a series of expansion means located between said conductors, said expansion means having the units of the series themselves spaced, means spacing the series from the sheath, comprising a rope-like material and bights therein adapted to space the units of said series of expansion means.

4. A cable comprising a sheath, helically arranged conductors therein, a series of expansion members between said conductors and spacing means between said members and the sheath, said spacing means having bights reaching between the expansion members of the series.

5. A cable comprising a sheath, a plurality of conductors therein, a plurality of serially arranged flat expansion members between at least a pair of juxtaposed conductors and spacers longitudinally spaced and radially positioned between said expansion members.

6. A cable comprising a sheath, a plurality of conductors therein and a plurality of serially arranged flat expansion members between at least one pair of juxtaposed conductors, spacing means between said expansion members and the sheath and between the expansion members themselves.

7. A cable comprising a sheath, a plurality of conductors therein and a plurality of flat expansion members between at least a pair of juxtaposed conductors, and spacer material at the edges of each expansion member.

8. A cable comprising a sheath, a plurality of conductors therein and a plurality of flat expansion members between a single pair of juxtaposed conductors and spacer material at the edges of each expansion member.

9. A cable comprising a sheath, a plurality of conductors therein and a plurality of flat expansion members between at least a pair of juxtaposed conductors and spacer material at edges of said expansion members and space between said spacer material and the expansion members.

10. A cable comprising a sheath, a plurality of conductors therein and a plurality of flat expansion members between a single pair of juxtaposed conductors, and spacer material at edges of each expansion member and space between said spacer material and the expansion members.

11. A cable comprising a sheath having spaced expansion means therein, conductors therein and rope-like spacer material having radial convolutions extending between the spaced expansion means, the non-convoluted portions of the spacers lying between said expansion means and the sheath.

12. A cable comprising a sheath having spaced expansion means therein, conductors therein and rope-like spacer material having radial convolutions extending between the spaced expansion means, the non-convoluted portions of the spaces lying between said expansion means and the sheath, said spacer material comprising a plurality of strands.

13. A cable comprising a sheath having spaced expansion means therein, said expansion means having edges formed in a longitudinal direction and spacing means for the outer edges, spaces between the successive elements of the expansion means, said spacing means being also radially positioned at intervals.

14. In a cable a sheath, conductors therein, a series of spaced expansion members within the sheath and spacing means at the outer edges of said expansion members, said spacing means having radial portions, the radial and longitudinal elements thereof being continuous.

15. A cable comprising a sheath, a plurality of conductors therein, at least one series of longitudinally spaced expansion means between at least one pair of conductors and spacers located between successive members of said series of expansion means, said expansion means comprising relatively flat, hollow, tubular, impermeable members.

16. A cable comprising a sheath, a plurality of insulated conductors therein, at least one expansion member, consisting of a separate tube having a flat portion laid longitudinally between at least one pair of said insulated conductors, and spacer material located between said pair of insulated conductors and said sheath adapted to maintain said insulated conductors in spaced relation to one another to provide a space for said expansion member which shall prevent damage to said expansion member by mechanical pressure from adjacent surfaces.

17. A cable comprising a sheath, a plurality of insulated conductors therein, at least one member, consisting of a separate tube having a flat portion laid longitudinally between at least one pair of said insulated conductors, and spacer material located between said pair of insulated conductors and said sheath adapted to maintain said insulated conductors in spaced relation to one another to provide a space for said member which shall prevent damage to said member by mechanical pressure from adjacent surfaces.

18. A cable comprising a sheath, a plurality of insulated conductors, at least one expansion member consisting of a separate tube having a flat portion laid longitudinally between at least one pair of said insulated conductors, and spacer material longitudinally arranged between said expansion means and said sheath and between the said expansion member and the central portion of the cable, adapted to maintain said insulated conductors in spaced relation to one another to provide a space for said expansion member which is larger than the expansion member in order to prevent damage to said expansion member by mechanical pressure from adjacent surfaces.

19. A cable comprising a sheath, a plurality of insulated conductors, at least one expansion member consisting of a separate tube having a flat portion laid longitudinally between at least one pair of said insulated conductors, and spacer material longitudinally arranged between said expansion member and the central portion of the cable adapted to provide a central space for said expansion member to prevent damage to its inner edge by mechanical pressure from adjacent surfaces.

PHILIP H. CHASE.